US006260913B1

(12) United States Patent
Sekita et al.

(10) Patent No.: US 6,260,913 B1
(45) Date of Patent: Jul. 17, 2001

(54) SMALL FOUR-WHEELED VEHICLE (75) Inventors: Takahito Sekita; Yutaka Murata, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,410

(22) Filed: Sep. 3, 1999

(30) Foreign Application Priority Data

Sep. 7, 1998 (JP) .................................................. 10-253115

(51) Int. Cl.[7] ....................................................... B60J 7/00
(52) U.S. Cl. .................... 296/190.08; 296/185; 296/77.1; 296/68.1; 296/66; 280/748; 280/751
(58) Field of Search ................................. 296/185, 77.1, 296/68.1, 66, 190.08, 901; 280/748, 751

(56) References Cited

U.S. PATENT DOCUMENTS

| | | | | |
|---|---|---|---|---|
| 3,215,113 | * | 11/1965 | Roberts ................................. | 296/185 |
| 3,331,627 | * | 7/1967 | Schroder et al. ..................... | 296/185 |
| 3,409,323 | * | 11/1968 | Schweser ............................. | 296/185 |
| 3,632,156 | * | 1/1972 | Schweser ............................. | 296/185 |
| 3,983,952 | * | 10/1976 | McKee ................................. | 296/185 |
| 4,049,309 | * | 9/1977 | Seal ...................................... | 296/185 |
| 4,089,542 | * | 5/1978 | Westerman ........................... | 296/185 |
| 4,521,049 | * | 6/1985 | Genma et al. ....................... | 296/185 |
| 4,537,446 | * | 8/1985 | Roney et al. . | |
| 4,573,546 | * | 3/1986 | Irimajiri et al. ..................... | 296/185 |
| 4,671,563 | * | 6/1987 | Shakespear ........................... | 296/185 |
| 4,804,199 | * | 2/1989 | Picard .................................. | 296/185 |
| 4,883,308 | * | 11/1989 | Singer .................................. | 296/185 |
| 4,946,193 | * | 8/1990 | Oka . | |
| 4,966,408 | * | 10/1990 | Yura .................................... | 296/185 |
| 5,340,177 | * | 8/1994 | Maxam . | |

FOREIGN PATENT DOCUMENTS 61-169373   7/1986 (JP) .

OTHER PUBLICATIONS

Patent Abstract of Japan, vol. 014, No. 417 (C–0756), JP 02 159290A, Jun. 19, 1990, Yamaha Motor Co.,Ltd.*
Patent Abstract of Japan, vol. 014, No. 367 (M–1008), JP 02 133292A, May 22, 1990, Iseki & Co Ltd).*
Patent Abstract of Japan, vol. 007, No. 217 (M–245), P 58 110378A, Jun. 30, 1983, Yamaha Hatsudoki KK).*

* cited by examiner

Primary Examiner—Joseph D. Pape
Assistant Examiner—Kiran B. Patel (57) ABSTRACT

A small four-wheeled vehicle frame cover covering a body frame for supporting a pair of front wheels and a pair of rear wheels includes a floor panel, side decks, a front deck, and a rear deck. The side decks extend laterally from opposite sides of a cabin, the front deck is present in front of the cabin, and the rear deck is positioned behind the cabin. The decks surround the cabin, forming a gallery. An interior frame constituting the cabin includes a driver supporting unit which is composed of a seat cushion, a seat back, shoulder pads, and side supports. The interior frame and driver supporting unit are positioned way back from entrances in order to enlarge the entrances.

18 Claims, 7 Drawing Sheets

SMALL FOUR-WHEELED VEHICLE

BACKGROUND OF THE INVENTION

1. Field of the Invention

This invention relates to a small four-wheeled one-man vehicle. More particularly the present invention relates to a small four-wheeled vehicle provided with a cabin with wide open sides for assuring ease of entering and exiting the cabin, and a driver supporting unit for maintaining a driver in a reliable state in the vehicle.

2. Description of Background Art

Small four-wheeled vehicles usually include a body frame having a lower frame for supporting two front wheels and two rear wheels, and an upper frame which is upwardly curved in order to form a cabin. The vehicles have open right and left sides for allowing a driver to enter and exit the vehicle with ease. Japanese Patent Laid-Open No. Sho 61-169373 discloses an example of such a vehicle.

Such a small four-wheeled vehicle, having a cabin with wide right and left open sides, assures a driver of such a vehicle superior entry and exit to and from the cabin. However, due to the wide open sides of the vehicle, often the driver of such a vehicle tends to feel uneasy or unsafe while operating the vehicle.

The foregoing small four-wheeled vehicle is relatively narrow, and therefore is easily parked in a small space. However, the driver cannot enter or exit the vehicle when it is parked in a small space that is substantially equal to the width of the vehicle and is surrounded by adjacent vehicles. Therefore, a parking space width has to be determined based on the width of the vehicle and an additional space to allow the driver to enter or exit the vehicle. Thus, the design of the background art fails to provide a vehicle which maximally utilizes available vehicle parking space.

The background art has attempted to reduce the width of such small four-wheeled vehicles, but in doing so it has been found that cabin space must be significantly reduced. A smaller cabin space reduces the comfort level of the driver of such vehicles. Furthermore, there is a lower limit at which the width may be reduced. Exceeding this limit seriously effects the comfort and drivability of the vehicles.

SUMMARY AND OBJECTS OF THE INVENTION

Therefore, in order to overcome the deficiencies and disadvantages of the background art, a main object of the invention is to provide a small four-wheeled vehicle that can support a driver stably, safely and reliably without sacrificing the advantage of entering and exiting the vehicle with ease, and which maintains a vehicle width which assures comfortable drivability of the vehicle.

According to a first feature of the invention, there is provided a small four-wheeled vehicle including a pair of right and left front wheels and a pair of right and left rear wheels. A cabin is positioned at the center of a vehicle body end having open right and left sides. The cabin interior is provided with shoulder pads for supporting shoulders of a driver, and a driver supporting unit having side supports for supporting hips of the driver.

In accordance with a second feature of the invention, the small four wheeled vehicle further includes flat platforms provided in front of, behind and at opposite sides of the cabin. The flat platforms are contiguous to one another.

The small four-wheeled vehicle further includes front and rear bumpers at the front and rear ends of the vehicle body, and foot steps formed on the front and rear bumpers. The vehicle further includes luggage-fastening rails on the front and rear platforms.

According to the first feature of the invention, the driver can be reliably seated in the vehicle using the shoulder pads and side supports in the cabin even when the cabin has large open right and left sides.

In accordance with the second feature, the platforms are provided in front of, behind the cabin and at the opposite sides of the cabin. The platforms are contiguous to one another. Even when the vehicle is parked in a small space, the driver can enter or exit the vehicle via the right or left side platforms and then via the front or rear platforms. Therefore, even when the vehicle width is increased to a certain degree in order to increase comfort of the driver, the vehicle may still be parked in a relatively small parking space. Furthermore, the foot step on the front or rear bumper further facilitate the ease of entry or exit of the vehicle via the front or rear platform.

The flat front and rear platforms can further be used as luggage loading areas. When front and rear steps are provided with rails, luggage can be easily and reliably loaded on the platforms by engaging luggage fasteners into the rails. Additionally, the luggage fasteners can be locked at any position in the rails, so that luggage can be reliably supported in accordance with its shape and so on.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
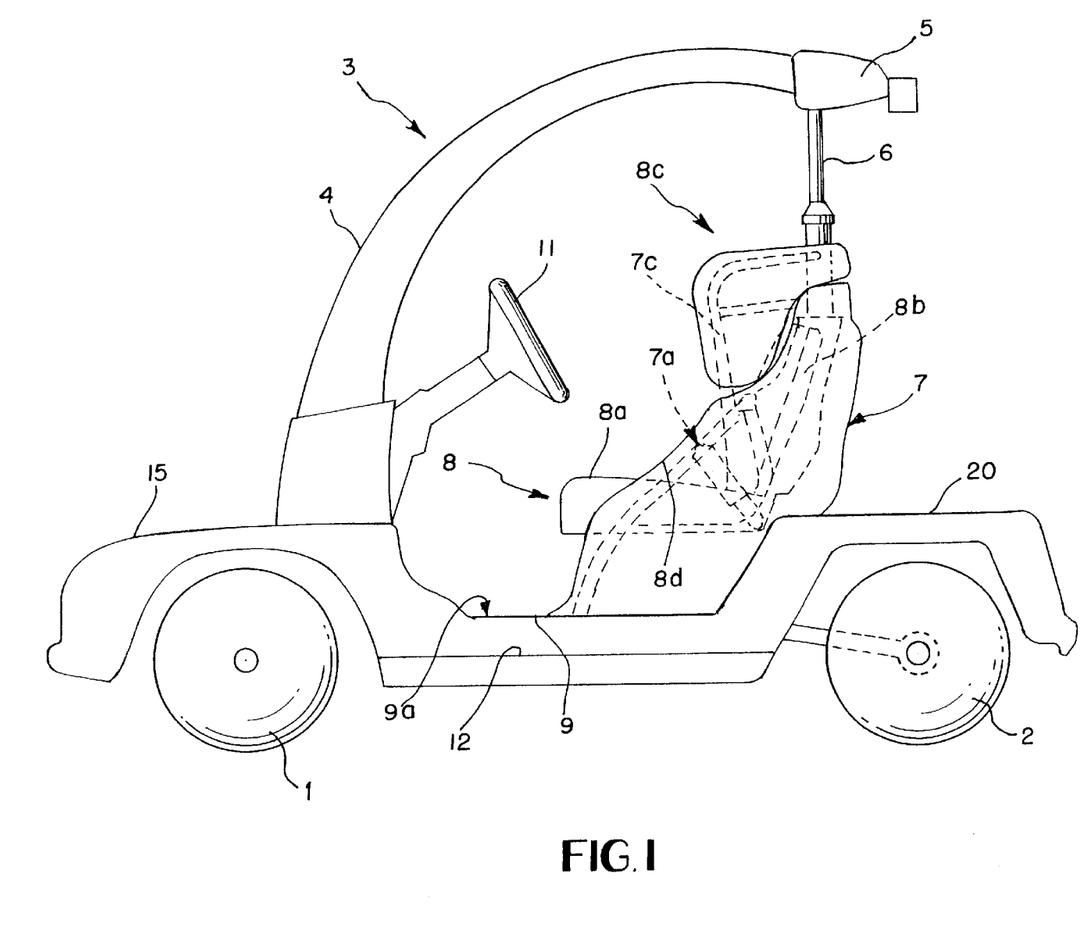
FIG. 1 is a side view of the small four-wheeled vehicle to which the first embodiment of the invention is applied.
Figure 2:
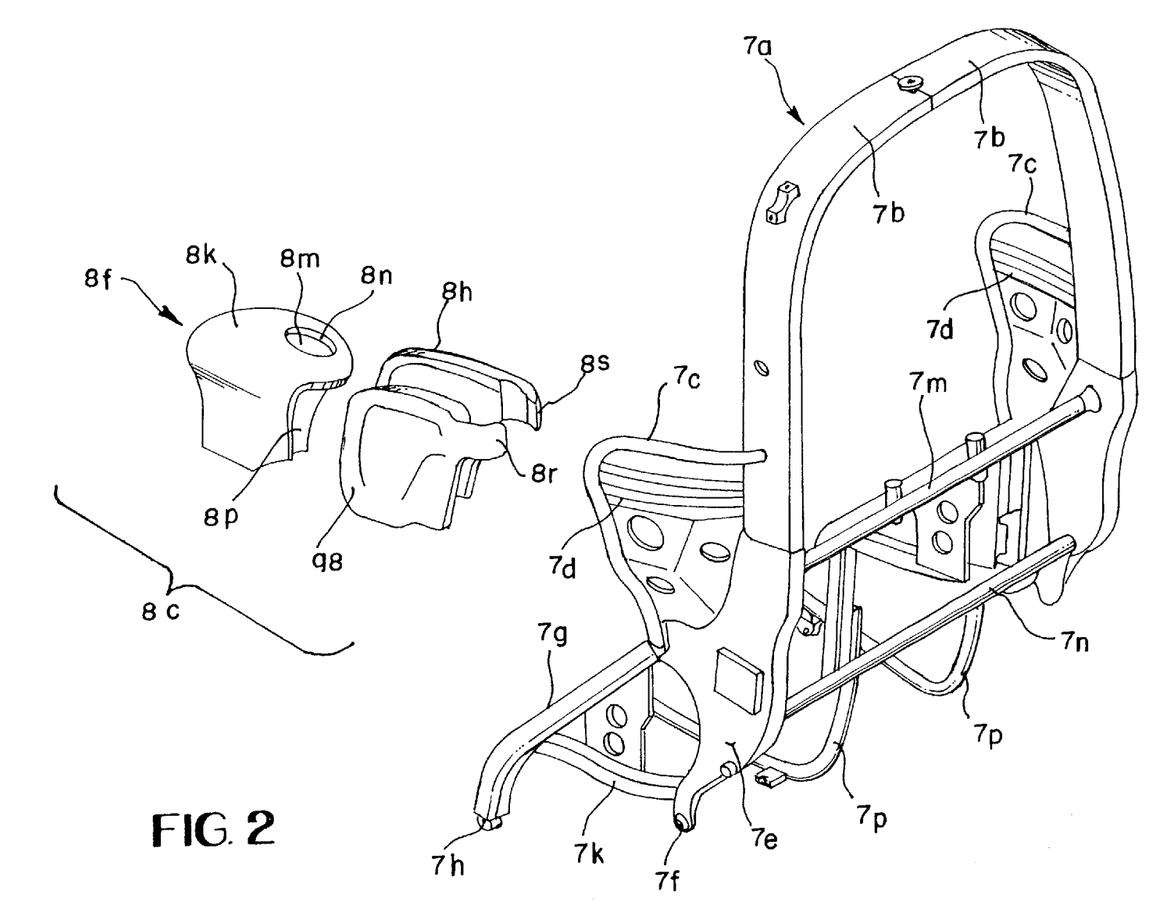
FIG. 2 is an exploded perspective view of essential parts of the vehicle.

The invention will be described with reference to a first embodiment as illustrated in FIGS. 1 and 2. FIG. 1 is a side view of a small four-wheeled vehicle. The small four-wheeled vehicle includes a pair of right and left front wheels 1, a pair of right and left rear wheels 2, and a cabin 3 positioned between the front and rear wheels 1 and 2. The small four-wheeled vehicle is propelled by an engine (not shown).

The cabin 3 is defined by a curved transparent windshield 4 for covering the front part of the vehicle body and a space above the driver, a roof panel 5 extending over the driver's head, and an interior frame 7 for supporting the roof panel 5 above the rear part of the vehicle body via pillars 6. The vehicle has large right and left open sides in the moving direction of the vehicle. The windshield 4, roof panel 5, pillars 6 and inner frame 7 are arranged substantially in the shape of a loop when viewed from a side of the vehicle.

The interior frame 7 is made of an appropriate resin material, disposed at the center of the vehicle body, and serves as the rear part of the cabin 7, thereby defining a bucket-shaped space for receiving and supporting the driver. The bucket-shaped space opens toward the front part of the cabin 3.

A roll bar assembly 7a is disposed in the space defined by the interior frame 7, and is provided with a seat cushion 8a, a seat back 8b, and shoulder pads 8c.

Edges of the interior frame 7 extend forward at positions corresponding to the driver's hips, and function as side supports 8d.

A driver supporting unit 8 is constituted by the seat cushion 8a, the seat back 8b, the shoulder pad 8c, and side supports 8d.

The roll bar assembly 7a is attached to the body frame (shown in FIG. 6) via legs 7h and 7f. Opposite side edges of a floor panel 9 are raised in the shape of a rib between the front and rear wheels 1 and 2, and serve as entrances 9a. Side decks 12 are positioned under the entrances 9a.

The opposite sides of a lower part of the interior frame 7 stand back from the entrances 9a toward the center of the vehicle body, so that the driver gets in or out of the vehicle via the entrances 9a and the sides of the interior frame 7.

The side decks 12 extend along the cabin 3, so that the driver can reach the front deck 15 above the front wheels 1 or the rear deck 20 above the rear wheels 2 via any of the side decks 12. The front and rear decks 15 and 20 have flat upper surfaces.

The floor panel 9, side decks 12, front deck 15, rear deck 20 and so on are constituted by a frame cover extending over the body frame. The side decks 12 are present on the opposite sides of the cabin 3, and the front and rear decks 15 and 20 extend from the front and rear parts of the cabin 3. The side, the front and the rear decks 12, 15 and 20 surround the cabin 3, thereby forming a gallery around the cabin 3. Reference numeral 11 represents a steering wheel.

FIG. 2 three-dimensionally shows the structure of the roll bar assembly 7a and the shoulder pads 8c. The roll bar assembly 7a includes arched portions 7b made of pipes. The arched portions 7b connect via their apexes to the lower ends of the pillars 6.

The arched portions 7b also connect to side brackets 7e via right and left ends thereof Lower ends of the arched portions 7b serve as legs 7f which are attached to the body frame. A pair of right and left wings 7c extend between the opposite sides of the roll bar assembly 7a and the longitudinal centers of the side brackets 7e.

The wings 7c are positioned at a level corresponding to the driver's shoulders, and are reinforced by panels 7d. The lower ends of the wings 7c are connected to the upper ends of the front legs 7g.

Each front leg 7g extends obliquely toward the floor panel 9 of the roll bar assembly 7a and is attached to the body frame at a lower end 7h. Reinforcing pipes 7k are provided in order to connect the centers of the front legs 7g to the side brackets 7e, i.e. upper ends of the pipes 7k are connected to the front legs 7g.

The right and left side brackets 7e are coupled via upper and lower cross pipes 7m and 7n. The lower cross pipe 7n is provided with an auxiliary leg 7p, which extends downward from the cross pipe 7n, is bent forward, and has its front end coupled to a cross pipe (not shown) for connecting the right and left front legs 7g.

Each shoulder pad 8c includes an outer cover 8f, a left outer pad 8g, and a right inner pad 8h. The outer cover 8f is hollow, and is made of a material such as soft sponge which is soft to the touch.

An upper part 8k of the outer cover 8f extends along the length of the vehicle, and has an opening 8m for allowing the arched portion 7b to pass through. A slit 8n is formed on the edge of the opening 8m. The outer cover 8f has a slit 8p at the rear part thereof, so that the outer and inner pads 8g and 8h are inserted into the outer cover 8f when they are brought into contact with each other.

Both the outer and inner pads 8g and 8h serve as soft and flexible shock absorbers, are made of sponge or the like which is harder than the outer cover 8f, and are shaped substantially identical to the wings 7c. When the outer and inner pads 8g and 8h are brought into contact each other, they are substantially identical to the outer cover 8f with respect to their shapes.

Curved mounting parts 8r and 8s are formed at rear ends of the outer and inner front pads 8g and 8h so as not to interfere with the arched portions 7b. When the outer pads 8g and the mounting parts 8r and 8s are placed on the inner and outer side surfaces of the wing frame 7c, the mounting parts 8r and 8s sandwich the opposite sides of the arched portions 7b.

Each shoulder pad 8c is assembled by placing the outer pad 8g and inner pad 8h on the inner and outer side surfaces of the wing 7c, and attaching the outer cover 8f with the mounting parts 8r and 8s sandwiched between the inner and outer sides of the arch 7b. Then, the outer and inner pads 8g and 8h will be inserted into the outer cover 8f via the slit 8p.

Thereafter, each slit 8n is opened in order to insert the arched portion 7b into the opening 8m. After this, the slit 8n is returned to the original state, so that the outer cover 8f, and outer and inner pads 8g and 8h constitute one shoulder pad 8c, which is attached to the wing 7c.

The operation of the invention will be described hereinafter. Referring to FIG. 1, the shoulder pads 8c and the side supports 8d constitute the driver supporting unit 8. The shoulder pads 8c support the driver's shoulders. The side supports 8d support the driver's hips. Therefore, even when the cabin 3 has the large open sides, the driver can be reliably seated on the driver supporting unit 8.

Furthermore, the shoulder pads 8c can be easily formed using the roll bar assembly 7a while the side supports 8d can be easily formed using part of the interior frame 7. Still further, the inferior framed end the driver supporting units are positioned a way back from the entrances 9a, which is effective in preventing the entrances 9a from being narrowed. Therefore, the driver can get in or out of the vehicle without any problem.

The entrances 9a and side decks 12 are so wide that the driver can tread on either the right or left side deck 12, from which he or she can move either to the front deck 15 or the rear deck 20.

Figure 3:
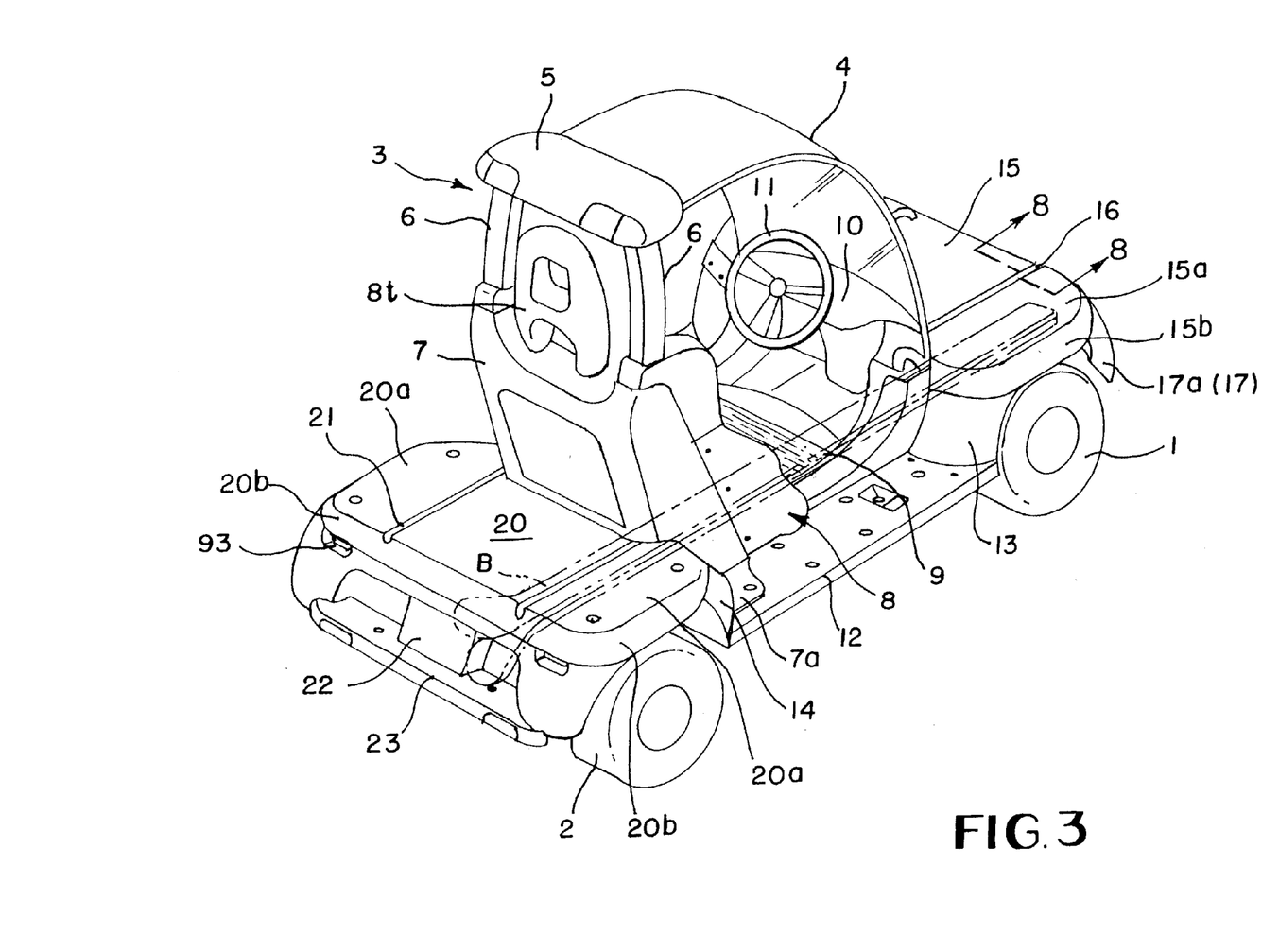
FIG. 3 is a perspective view of the small four-wheeled vehicle according to the second embodiment.
Figure 4:
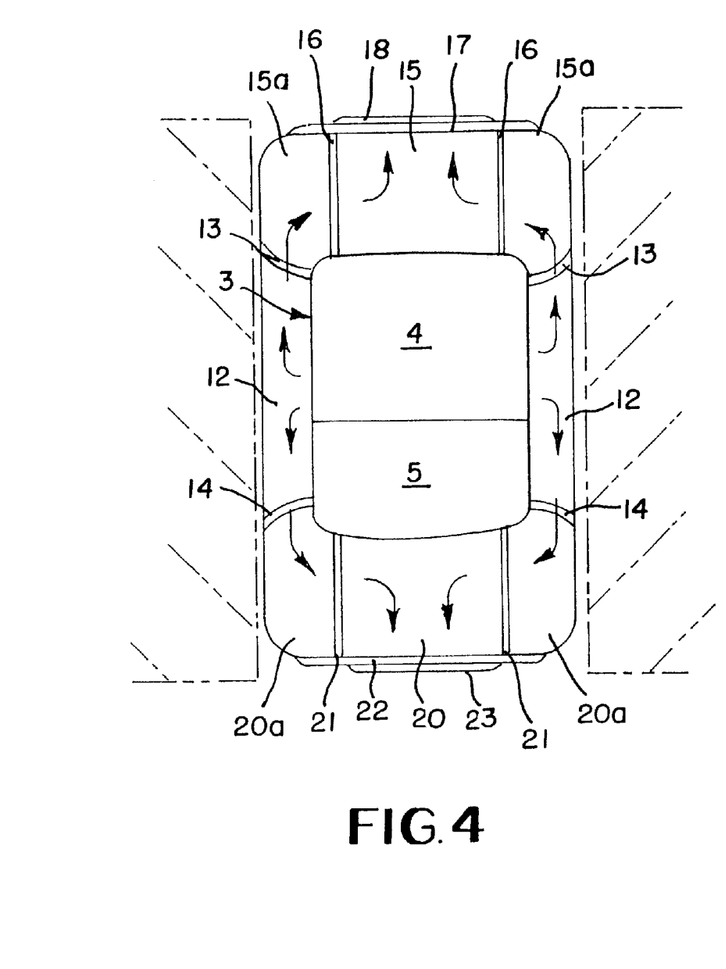
FIG. 4 is a schematic top plan view of the body frame.
Figure 5:
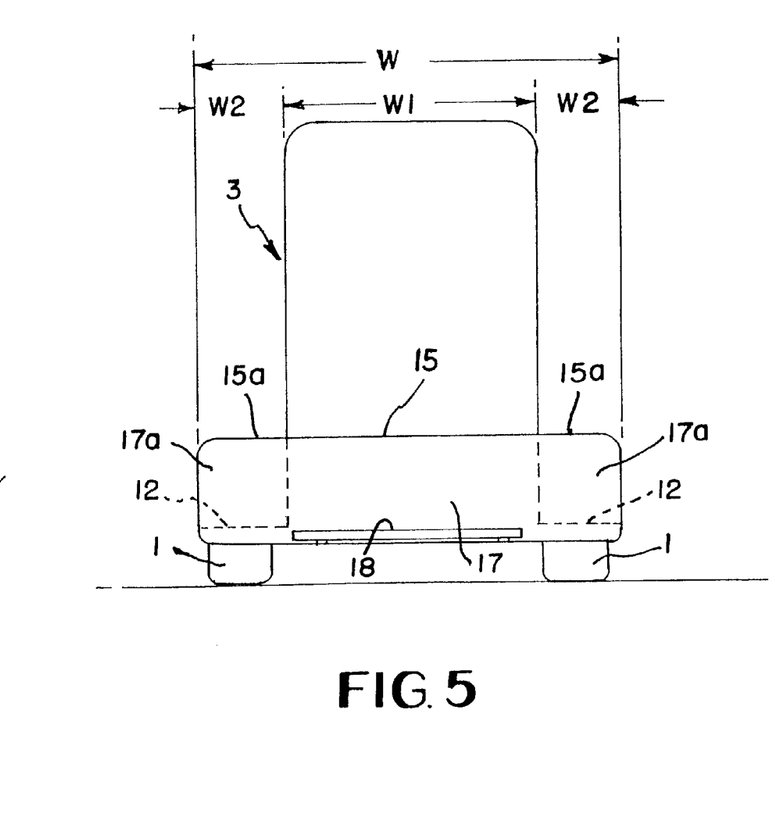
FIG. 5 is a schematic rear view of the body frame.
Figure 6:
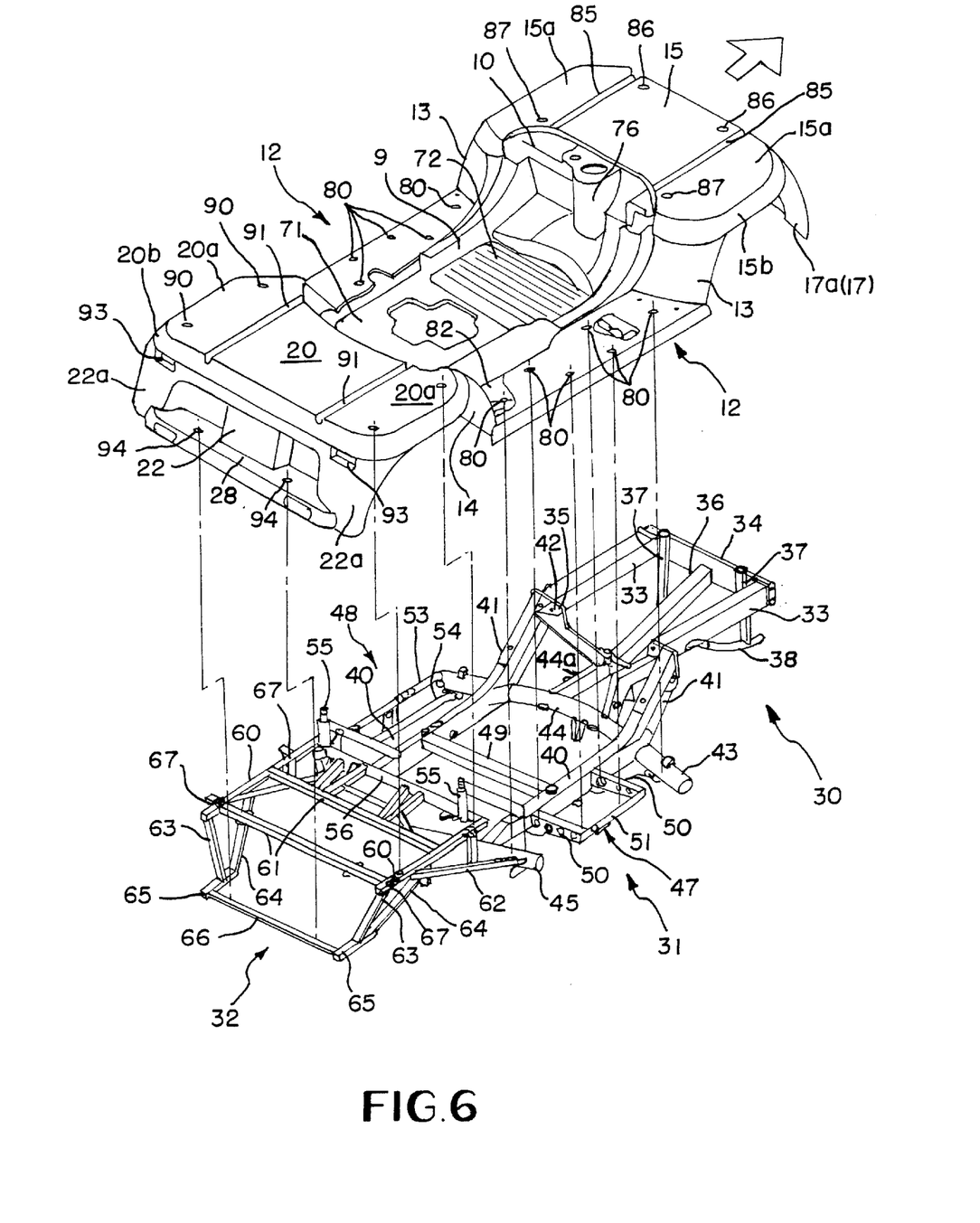
FIG. 6 is an exploded perspective view of the frame panel and the body frame.
Figure 7:
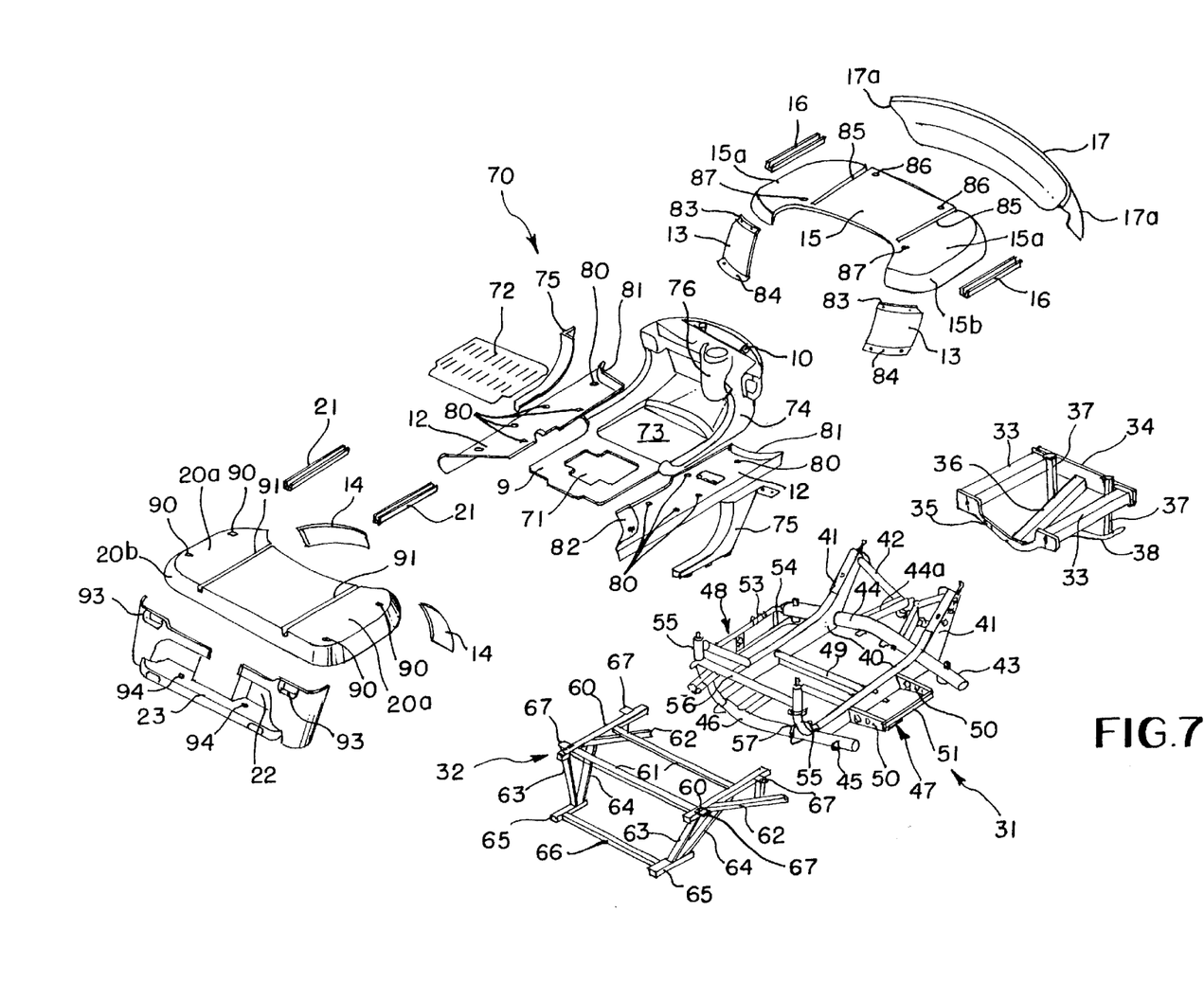
FIG. 7 is a detailed exploded view of the frame panel and the body frame.
Figure 8:
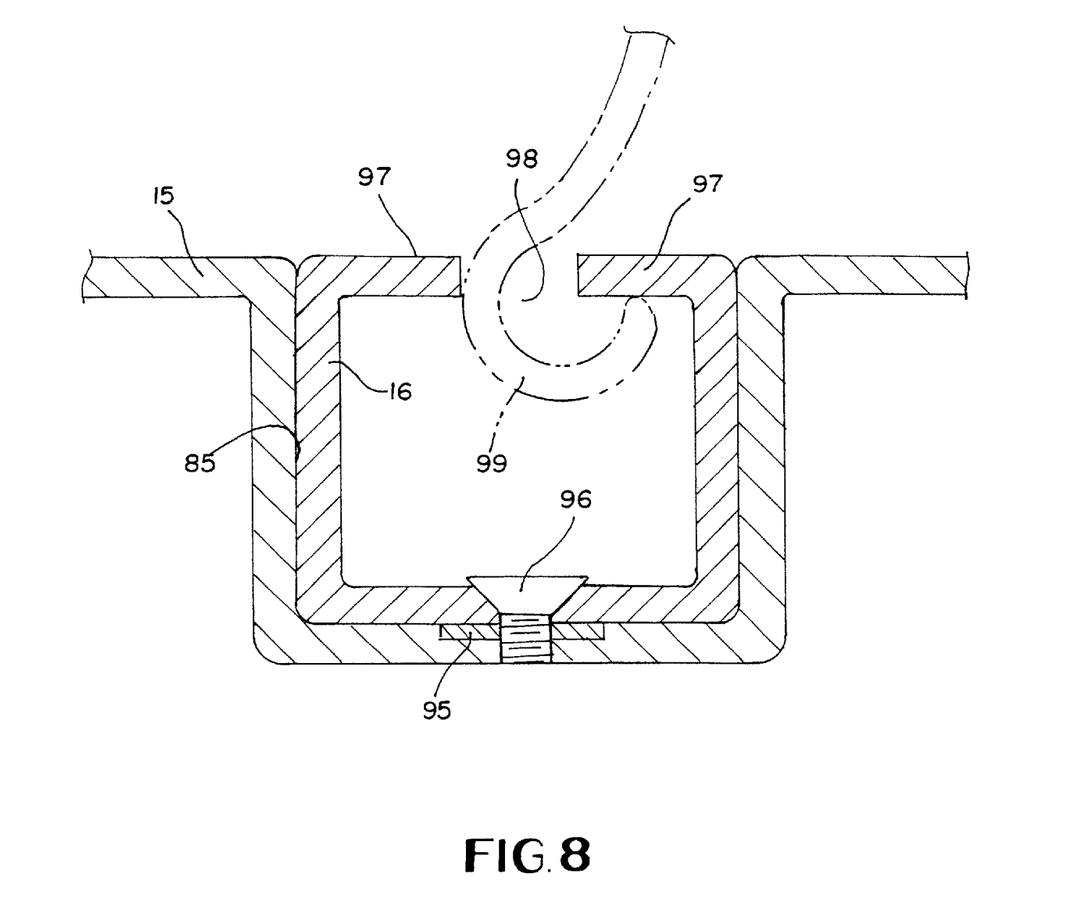
FIG. 8 is a sectional view taken along line 8—8 in FIG. 3.

A second embodiment of the invention will be described hereinafter. FIG. 3 is a perspective view of a small four-wheeled one-man vehicle in the second embodiment. FIG. 4 is a schematic top plan view of the small four-wheeled vehicle. FIG. 5 is a schematic front view thereof. FIG. 6 is an exploded perspective view of a body frame and covers, specifically showing how parts are assembled. FIG. 7 is a perspective view showing details of components. FIG. 8 is an enlarged sectional view taken along line 8—8 in FIG. 3. The components identical to those in the foregoing embodiment are assigned identical reference numerals.

As illustrated in FIG. 3, a cabin 3 defines a space where the driver is seated when driving the vehicle, and has right and left open sides through which the driver gets in or out of the vehicle. The vehicle includes a curved windshield 4 covering the front and upper parts of the cabin 3, a roof panel 5 covering the space above the driver's head, and a interior frame 7 supporting the rear end of the roof panel 5 via pillars 6. The interior frame 7 includes a driver supporting unit 8, which is provided with shoulder pads 8c and side supports 8d. The components are structured differently from those in the first embodiment, but function identically to them. A head restraint 8t is attached on top of the interior frame 7.

A floor panel 9 is provided in front of the driver supporting unit 8 with an instrument panel 10 being present on the front side thereof. The instrument panel 10 is an integral part of the floor panel 9, and faces the driver supporting unit 8. A steering wheel 11 is attached at the upper center of the instrument panel 10.

A pair of side decks 12 extend along the opposite sides of the cabin 3. A ground clearance of the side decks 12 is substantially equal to a radius of the front and rear wheels 1 and 2. The side decks 12 connect to rear pieces 13 of front mudguards and front pieces 14 of rear mudguards. The side decks 12 are described as examples of platforms provided on the opposite sides of the cabin 3, and are substantially flat.

A flat front deck 15 covers a space above the front wheels lend the cabin 3. The opposite sides of the front deck 15 serve as upper parts 15a of the front mudguards for covering the front wheels 1. The upper parts 15a connect via rear parts to upper parts of the rear pieces 13 of the front mudguards. The front deck 15 is described as an example of the platform provided in front of the cabin 3.

A pair of parallel rails 16 extend on the front deck 15 along the length of the vehicle. A front bumper 17 is attached to the front part of the front deck 15. The opposite side edges 17a of the front bumper 17 serve as parts of the front mudguards to cover the front upper parts of the front wheels 1.

A flat rear deck 20 covers the space behind the interior frame 7 and above the rear wheels 2. The opposite sides of the rear deck 20 constitute upper parts 20a of the rear mudguards extending over the rear wheels 2, thereby functioning as parts of the rear mudguards. Front ends of the upper parts 20a connect to front pieces 14 of the rear mudguards. The rear deck 20 is described as an example of the platform provided behind the cabin 3.

A pair of rails 21 are provided on the rear deck 20 along the length of the vehicle. A rear bumper 22 is attached to the rear end of the rear deck 20.

Opposite ends of the rear bumper 22 constitute parts of the rear mudguards covering the rear parts of the rear wheels 2. The rear bumper 22 has its wall slightly recessed at the opposite sides thereof toward the front part of the vehicle, and slightly sloped toward the rear part of the vehicle. A flat area is formed at the lower center of the rear bumper 22 and serves as a foot step 23.

The front bumper 17 is structured similarly to the rear bumper 22, and is provided with a foot step 18 (see FIG. 4). The foot steps 18 and 23 have the same ground clearance, which is approximately equal to a ground clearance of the side decks 12.

Referring to FIG. 4 showing the top plan view of the small four-wheeled vehicle, the cabin 3 is surrounded by the flat right and left side decks 12, flat front deck 15, and flat rear deck 20. The front and rear ends of the right and left side decks 12 connect to the mudguard upper portions 15b and 20b of the front and rear decks 15 and 20. Therefore, the foregoing decks form a gallery around the cabin 3.

As shown in FIG. 5, both the front and rear decks 15 and 20 have a substantially equal ground clearance. There is a height difference between the side decks 12 and the front and rear decks 15 and 20. This height difference is approximately equal to a height of the rear pieces 13 of the front mudguards and a height of the front pieces 14 of the rear mudguard, and is slightly larger than the radius of the front and rear wheels 1 and 2. Therefore, the height difference does not cause any problem when the driver walks on the foregoing decks.

The driver may get out of the vehicle to the ground via two routes. Specifically, one route is formed via the right or left side deck 12, the upper part 15a of the front mudguard, the center of the front deck 15, end the foot step 18. The other route is via the right or left side deck 12, the rear mudguard upper part 20a, the center of the rear deck 20, and the foot step 23. Since these routes are continuous via the side decks 12, the driver can walk to the front or rear part of the vehicle as desired.

A width W1 of the cabin 3 is smaller than a total width W of the vehicle by a width of two times a side deck width W2. The cabin 3 is wide enough to accommodate the single driver. The vehicle width W is determined so as to satisfy requirements such as a tread width that assures comfortable driving.

The body frame and the frame cover will be described in detail hereinafter. Referring to FIGS. 6 and 7, the body frame is constituted by three sub-assemblies (refer to FIG. 7), i.e. a front frame 30 for supporting the front wheels 1, a center frame 31 for supporting the cabin 3, and a rear frame 32 for supporting the rear wheels 2 and an engine (not shown). The three sub-assemblies are coupled to one another in order to form the single body frame (as shown in FIG. 6).

As can be clearly seen in FIG. 7, the front frame 30 includes: a pair of right and left side members 33 which are parallel to each other; cross plates 34 and 35 for coupling the front and rear ends of the side members 33; a center member 36 positioned at the centers of the cross plates 34 and 35 and extending forward and upward; and a pair of stays 37 extending vertically at right and left corners where the center member 36, the right and left side members 33, and the cross plate 34 connect one another. Lower ends of the stays 37 are coupled by an under pipe 38.

The center frame 31 comprises: a pair of right and left main frames 40 made of thick square pipes; a cross plate 42 stretching between the front ends of sloping portions 41 of the main frames 40 and front and rear cross pipes 44 and 46 extending between the front and rear parts of the main frames 41; side deck supports 47 and 48 provided on the opposite sides of the main frames 40; and a cross member 49 extending across the centers of the main frames 40.

The cross plate 42 is coupled to the cross plate 35 of the front frame 30, and is also coupled, at the center thereof to a front end of a center beam 44a extending forward from the front cross pipe 44.

The opposite ends of the front cross pipe 44 serve as projections 43 extending laterally from the right and left main frames 40. The opposite ends of the rear cross pipe 46 serve as projections 45 similar to the projection 43. The right and left side deck supports 47 and 48 project from the opposite sides of the main frames 40.

The side deck support 47 is constituted by a pair of front and rear deck stays 50 which project from one side of the main frames 40, and a pipe 51 for coupling the front ends of the deck stays 50. The side deck support 47 is in the shape of a rectangular frame.

The side deck support 48 is composed of a pair of pipes 53 and 54 which project from the top end bottom of the projection 43 of the front cross pipe 44 and the rear side surface of one of the main frames 40. The side deck support 48 is substantially in the shape of a rectangular frame.

A pair of upright pipes 55 are provided at the rear ends of the right and left main frames 40, and are coupled, at the centers thereof, by a cross pipe 56. The opposite ends of the cross pipe 56 project from the pipes 55, thereby serving as joints 57.

A height of the main frames 40 from the horizontal parts thereof to the tops of the sloping portions 41 and to the cross pipe 56 is substantially equal to the height difference between the side decks 12 and the front and rear decks 15 and 20.

The rear frame 32 includes: a pair of substantially horizontal upper pipes 60 extending along the length of the vehicle; a cross pipe 61 extending between the upper pipes 60; a pair of pipe stays 62 extending obliquely downward from rear ends of the upper pipes 60; a pair of down pipes 63 and 64 extending downward from rear ends of the pipe stays 62; a pair of right and left lower pipes 65 supported by lower ends of the pipe stays 62 via the down pipes 63 and 64; and a cross pipe 66 extending between the lower pipes 65.

The clearance between the lower pipes 65 and the upper pipes 60 is substantially equal to a height of the rear bumper 22 attached to the vehicle body. The front ends of the right and left upper pipes 60 align with the joints 57 at the opposite ends of the cross pipe 56 provided in the center frame 31. Furthermore, the front ends of the pipe stays 62 are connected to the rear cross pipe 46.

The front and rear ends of the upper pipes 60 are provided with deck mounting stays 67 projecting laterally.

The frame cover 70 (shown in FIG. 6) extending over the vehicle body is composed of the floor panel 9, side decks 12, rear pieces 13 of the front mudguard, front deck 15, front bumper 17, rear pieces 14 of the rear mudguard, rear deck 20, and rear bumper 22.

The floor panel 9 (not shown) is placed on the center frame 31, is fastened to the center beam 44a, cross member 49 and so on using bolts or the like. An opening 71 is formed on the floor panel 9 under the driver supporting unit 8, and is opened or closed using the driver supporting unit 8. Furthermore, an opening 73 is formed on the floor panel 9 in front of the opening 71, and is covered by a floor lid 72.

Right and left side walls 74 rise obliquely from the front right and left portions of the floor panel 9, and connect to the instrument panel 10. Since the side walls 74 are stepped on by the driver who is getting on or out of the vehicle, they are reinforced by side panels 75 substantially in the shape of an L. The instrument panel 10 has a steering post cover 76 as an integral part.

The right and left side decks 12 are fastened to the deck supports 47 and 48 using bolts or the like. The side decks 12 have a plurality of mounting openings 80 on their whole surfaces, connecting edges 81 folded upward at their front ends, and recesses 82 at rear ends. Lower ends 7a of the interior frame 7 are housed in the recesses 82 (refer to FIG. 3).

With respect to the rear pieces 13 of the front mudguards, upper ends 83 serve as joints with the front deck 15 while lower ends 84 serve as joints with the side decks 12. The upper ends 83 are brought into contact with inner surfaces of a downward flange 15b which is provided round the front deck 15 except for the rear center hereof, end are fastened to the flange 15b using tapping screws or the like. The lower ends 84 are bent substantially at right angles, and are placed under the connecting edges 81 of the side decks 12, and are fastened similarly to the upper ends 83 (see FIG. 6).

The upper edge of the front bumper 17 at the front edge of the front deck 15 are contacted with the inner surfaces of the flanges 15b.

The front deck 15 has, on its surface, a pair of rail grooves 85 which are parallel to each other and are formed at positions above the side members 33. Rails 16 are fitted into the grooves 85. Vehicle body mounting openings 86 and 87 are formed at the front and rear ends of the front deck 15 and on the opposite sides of the rails 85.

The rear deck 20 has vehicle body mounting openings 90 at the front and rear parts thereof, i.e. at positions aligned with the right and left upper pipes 60. A pair of rail grooves 91 are formed, along the length of the vehicle, on the rear deck 20 at positions inside the openings 90. The rear deck 20 also has stays 92 positioned at the right and left ends as integral parts and extending downward.

The rear deck 20 is provided with a downward flange 20b round its edge except at the front center thereof. The upper edge of the rear bumper 22 is put into the upper part of the flange 20b, and the right and left recesses 93 and the stays 92 are aligned and fastened together using tapping screws.

The foot step 23 under the rear bumper 22 is positioned on the cross pipe 66, and has mounting openings 94 at appropriate positions thereon.

The upper and lower ends of the front pieces 14 of the rear mudguard are attached similarly to the rear pieces 13 of the front mudguard. Specifically, the upper ends are aligned with the inner surface of the flange 20b of the rear deck 20 and fastened therewith while the lower ends are aligned with the underside of the rear ends of the side decks 12 and fastened therewith.

Referring to FIG. 8, each rail groove 85 on the front deck 15 is substantially in the shape of C, has an open top that is wide enough to receive the rail 16, and a plurality of nuts 95 inserted at appropriate positions therein. The rails 16 are fitted and fastened in the grooves 85 by engaging screws 96 with the nuts 95.

Each rail 16 is a long member having a cross section substantially in the shape of a letter C, and is placed in the groove 85 so as to be substantially flush with or lower than the upper surface of the front deck 15. Top edges 97 of rails 16 are folded inward in order to make a slit 98 narrow. Hooks 99 or the like at ends of luggage holding members (not shown) such as a net or cords may be engaged with the folded top edges 97 of the rails 16. The rails 21 and rail grooves 91 on the rear deck 20 are identical to those on the front deck 15.

Well-known slidable fixtures that can be locked at any positions in the rails, and may be used as members for holding luggage in place of the hooks 99.

The frame cover 70 is attached to the body frame as shown in FIG. 6. First of all, the floor panel 9, front bumper 17 and rear bumper 22 are attached to the body frame. The rear bumper 22 is attached with the foot step 23 placed on the cross pipe 66 and fastened to the nuts of the cross pipe 66 using bolts or the like inserted through the mounting openings 94. The front bumper 17 is attached in the similar manner to the foot step 18 coupled to the under pipe 38.

Thereafter, the front and rear decks 15 and 20 are installed. The front deck 15 is placed on the right and left side members 33. The front mounting openings 86 are aligned with the upper ends of the stays 37, and the rear mounting openings 87 are aligned with the projections 39 at the rear side surfaces of the side members 33. The front deck 15 is fastened to the side members 33 from above using bolts.

The rear deck 20 is placed on the right and left upper pipes 60 with the mounting openings 90 aligned with the corresponding deck mounting stays 67, and is fastened from above using bolts.

Thereafter, the right and left side decks 12 are placed on and attached to the side deck supports 47 and 48. In this case, the right side deck 12 is attached with the mounting openings 80 aligned with the front and rear projections 42 and 45, and with the nuts on the deck stays 50 and pipe 51, and is fastened from above using bolts. The left side deck 12 is attached in the similar manner to that of the right side deck 12.

The operation of this embodiment will be described hereinafter. If the small four-wheeled vehicle is parked in a space whose width is approximately equal to the vehicle width W, it may come into close contact with obstacles, such as adjacent vehicles being in the area of the side decks 12.

However, since the side decks 12 continue to the front deck 15 and the rear deck 20 via the upper parts 15a and 20a of the front and rear mudguards, the height difference between the side decks 12 and the upper parts 15a and 20a is substantially equal to a height of an ordinary step, and the front end rear decks 15 and 20 are flat, a gallery is formed around the cabin 3 on which the driver can walk.

The driver can get out of the vehicle via one of the side decks 12 and either the front deck 15 or the rear deck 20, and tread on the ground in front of or behind the vehicle. Although the vehicle has the width that can provide the cabin with a sufficient space and assure comfortable and safe driving, it can be parked in a relatively narrow space without any problem.

Furthermore, the foot steps 18 and 23 at the front and rear bumpers 17 and 22 allow the driver to easily enter or exit the vehicle via the front or rear part thereof.

The front and rear decks 15 and 20 also function as bonnets, so that the foot steps can be made without using dedicated members, which can simplify component structures. Furthermore, the opposite ends of the front and rear decks 15 and 20 function as the upper parts 15a and 20a of the front and rear mudguards, so that only the rear pieces 13 and front pieces 14 are required for the mudguards. This is also effective in simplifying component structures.

The front and rear decks 15 and 20 are flat so that they can be used as luggage loading areas. The luggage can be reliably held on the front or rear deck 15 or 20 by engaging the hooks 99 (shown in FIG. 8) or the like at desired positions in the rails 16 and 21 along the length of the front or rear deck. The hooks 99 or the like can be locked at any positions of the rails 16 and 21.

Furthermore, the rails 16 and 21 can reinforce the front and rear decks 15 and 20. Therefore, even if these decks are made of relatively light and thin panels, they can maintain rigidity which enables the driver to walk on them without any problem.

The opposite side ends of the front and rear decks 15 and 20 extend beyond the sides of the cabin 3, so that it is possible to load a long object using the foregoing opposite side ends.

The invention is not limited to the foregoing embodiments, and can be modified in a variety of ways. For example, the front, side and rear decks 15, 12 and 20 can be made of synthetic resin or metallic material. They are not always required to be entirely flat. So long as there is at least a continuous walking space between the side decks 12 and either the front deck 15 or the rear deck 20, the remaining parts of the decks may be curved or have any shape.

Furthermore, it is possible to maintain a relatively large height difference between the side decks 12, front deck 15 and rear deck 20. In such a case, a plurality of steps may be provided at the rear pieces 13 of the front mudguards and the front pieces 14 of the rear mudguards. The rear and front pieces 13 and 14 may be integral with the front, side or rear deck 15, 12 or 20. In such a case, steps are formed at positions corresponding to the rear and front pieces 13 and 14.

What is claimed is:

1. A small four-wheeled vehicle, comprising:
    a pair of right and left front wheels;
    a pair of right and left rear wheels being positioned downstream of said pair of right and left front wheels;
    a cabin positioned between said pair of right and left front wheels and said pair of right and left rear wheels, said cabin having open right and left sides;
    a driver supporting unit being disposed in said cabin, said driver supporting unit for supporting a user of said vehicle;
    shoulder pads for supporting shoulders of the user, said shoulder pads positioned on said driver supporting unit to substantially prevent lateral movement of said user; and
    side supports for supporting hips of said user, said side supports positioned on said driver supporting unit to further substantially prevent lateral movement of said user.

2. The small four-wheeled vehicle according to claim 1, further comprising flat platform means provided in front of, behind and at the opposite sides of said cabin, said flat platform means forming a continuous member, which forms a gallery around a periphery of said cabin.

3. The small four-wheeled vehicle according to claim 2, wherein front and rear bumpers are provided at the front and rear ends of the vehicle body, and foot steps are formed on said front and rear bumpers.

4. The small four-wheeled vehicle according to claim 2, wherein luggage fastening rails are disposed on said platform means in front of and behind said cabin.

5. The small four-wheeled vehicle according to claim 1, wherein each of said shoulder pads is comprised of three parts, a first part being an outer cover for a second part and a third part, said second part and said third part being attachable to make one integral member.

6. The small four-wheeled vehicle according to claim 5, wherein said first part has a slit defined in a rear end thereof, said slit facilitating insertion of said second part and said third part into said first part, whereby said second part and said third part are substantially covered thereby.

7. The small four-wheeled vehicle according to claim 5, wherein each of said second and third parts include a mounting part, said mounting part of each of said second and third parts forming a hole, when said second and third parts are integral, defined therebetween for encompassing a body part of said vehicle.

8. The small four-wheeled vehicle according to claim 1, wherein said side supports are contoured to contour fit under a bottom part of said shoulder pads, whereby said side supports and said shoulder pads appear as one contiguous member when positioned together along specific contoured edges.

9. A small four-wheeled vehicle, comprising:
  a pair of right and left front wheels;
  a pair of right and left rear wheels being positioned downstream of said pair of right and left front wheels;
  a cabin positioned between said pair of right and left front wheels and said pair of right and left rear wheels, said cabin having open right and left sides; and
  a curved transparent windshield being a part of said cabin, said transparent windshield for covering a mid-front part of said vehicle and extending over said cabin to provide cover therefor.

10. The small four-wheeled vehicle as set forth in claim 9, further including a driver supporting unit being disposed in said cabin, said driver supporting unit for supporting a user of said vehicle.

11. The small four-wheeled vehicle as set forth in claim 9, further comprising shoulder pads for supporting shoulders of the user, said shoulder pads positioned on said driver supporting unit to substantially prevent lateral movement of said user, and side supports for supporting the hips of said user, said side supports positioned on said driver supporting unit to further substantially prevent lateral movement of said user.

12. The small four-wheeled vehicle according to claim 9, further comprising flat platform means provided in front of, behind and at the opposite sides of said cabin, said flat platform means forming a continuous member, which forms a gallery around a periphery of said cabin.

13. The small four-wheeled vehicle according to claim 12, wherein front and rear bumpers are provided at the front and rear ends of the vehicle body, and foot steps are formed on said front and rear bumpers.

14. The small four-wheeled vehicle according to claim 12, wherein luggage fastening rails are disposed on said platform means in front of and behind said cabin.

15. The small four-wheeled vehicle according to claim 9, wherein each of said shoulder pads is comprised of three parts, a first part being an outer cover for a second part and a third part, said second part and said third part being attachable to make one integral member.

16. The small four-wheeled vehicle according to claim 15, wherein said first part has a slit defined in a rear end thereof, said slit facilitating insertion of said second part and said third part into said first part, whereby said second part and said third part are substantially covered thereby.

17. The small four-wheeled vehicle according to claim 16, wherein each of said second and third parts include a mounting part, said mounting part of each of said second and third parts forming a hole, when said second and third parts are integral, defined therebetween for encompassing a body part of said vehicle.

18. The small four-wheeled vehicle according to claim 9, wherein said side supports are contoured to contour fit under a bottom part of said shoulder pads, whereby said side supports and said shoulder pads appear as one contiguous member when positioned together along specific contoured edges.

\* \* \* \* \*